Nov. 24, 1959  J. OTT ET AL  2,914,362
GUIDE SYSTEM FOR RECIPROCATING MACHINE PARTS
Filed May 9, 1956  2 Sheets-Sheet 1
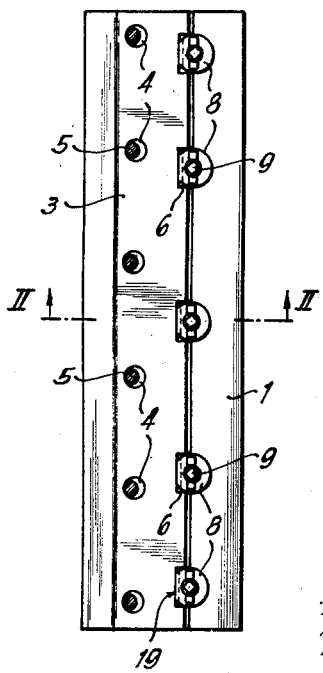
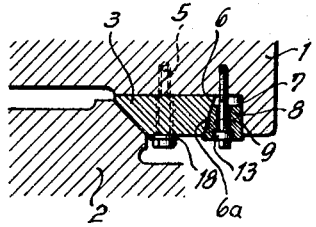
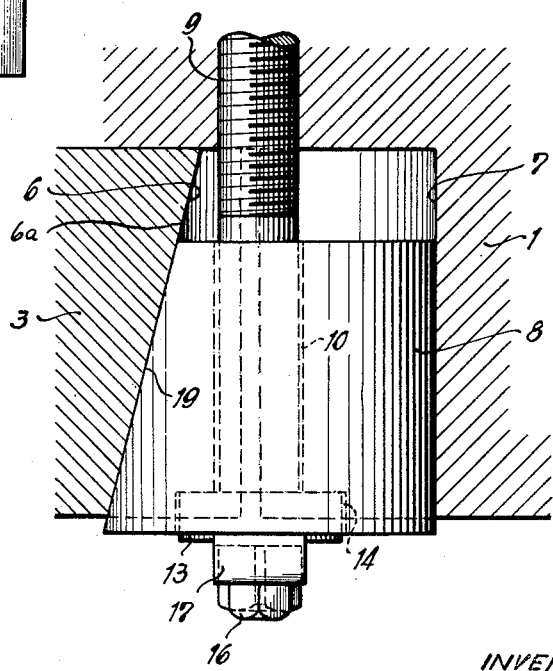
INVENTORS:
JOSEF OTT
FRIEDRICH HÄCKEL
RICHARD HUMMEL
ERWIN WIEDEMANN
MARTIN SIGEL Nov. 24, 1959   J. OTT ET AL   2,914,362
GUIDE SYSTEM FOR RECIPROCATING MACHINE PARTS
Filed May 9, 1956   2 Sheets-Sheet 2

INVENTORS:
JOSEF OTT
FRIEDRICH HÄCKEL
RICHARD HUMMEL
ERWIN WIEDEMANN
MARTIN SIGEL

United States Patent Office

2,914,362
GUIDE SYSTEM FOR RECIPROCATING MACHINE PARTS

Josef Ott, Faurndau, and Friedrich Häckel, Richard Hummel, Erwin Wiedemann, and Martin Sigel, Goeppingen, Germany, assignors to L. Schuler AG, Goeppingen, Germany Application May 9, 1956, Serial No. 583,770

Claims priority, application Germany June 14, 1955

4 Claims. (Cl. 308—3)

This invention relates to guide or setting means for reciprocally movable machine parts, for example, of a press equipped with a guide rail or ledge which is adjustable by at least one key or wedge member relative to the machine part to be guided.

In known guiding arrangements the guide ledge is adjustable by means of a key or wedge member ledge engaging between said guide ledge and the frame supporting or guiding the machine part to be guided, the key or wedge member ledge being movable parallel to the reciprocating movement of said machine part.

The manufacture of such key ledges or wedge members, which are often comparatively long and are only of small cross-section, is complicated, in particular in view of the reduced or weakened end at which a screw is usually attached which serves for displacing the key ledge or wedge member and which when the key ledge or wedge member is to be ground, interferes with the grinding operation of the latter.

In contradistinction to this known construction the present invention consists in that the key surface of the key or wedge member engaging between the guide ledge and the frame or like means for supporting the machine part to be guided is parallel to the direction of movement and inclined to the plane of movement of the machine part to be guided. The key or wedge member may be displaced or adjusted in a plane lying at right angles to the plane of movement and at right angles to the direction of movement of the machine part to be guided, so that the guide rail is set relative to the guiding surface of the machine part to be guided when the key or wedge member is displaced by a motion component acting at right angles to the plane of movement of the machine part to be guided.

It is therefore an important object of the invention to provide means enabling the new guide arrangement to be manufactured more easily and to be constructed of a simpler design than those heretofore known.

According to another known guide arrangement the guide ledges are adjusted relative to the guiding surface of the machine part to be guided, by means of adjusting screws which are disposed in the guiding machine part.

These screws receive comparatively high stresses in the form of lateral thrust forces resulting from the reciprocating movement of the machine part to be guided, and as a consequence the end portions of the screws must be sunk into the guide rail on account of the small pressure surface.

In contrast to this kind of guide arrangement the arrangement of the invention is capable of receiving great lateral thrust forces, without damage being caused to the guide ledge, since the surface pressure between the guide ledge and the key or wedge member is lower than in the case of the adjusting screws acting directly upon the guide ledge. Moreover, a more precise adjustment can be obtained with the new guide system, since a thread play of the adjusting screws which may possibly occur does not have any unfavorable effects.

As a further characteristic of the invention may be mentioned that the displaceable key or wedge member is subdivided into a plurality of members, distributed over the length of the guide ledge and preferably rockably mounted at a guiding machine part about an axis running at right angles to the guide. Thus the key members may bear with their key surfaces closely against the corresponding surface of the guide ledge.

When, for example, presses are assembled it may happen that the frames are not precisely in a vertical position. By means of the new arrangement comprising several displaceable key or wedge members the guide ledge may be brought precisely into a vertical position. Besides this, it is desirable for certain press drawing operations with form drawing tools having a large area that the punch or ram can be tilted or inclined which may be done quite easily and simply in accordance with the invention.

It is another feature of the invention that the key or wedge members are formed as rotary bodies, preferably cylinders, and are flattened at respective portions thereof forming the key or wedge surfaces. Moreover, cylindrical recesses corresponding to the key or wedge members are provided in the guiding machine part in which the key or wedge members are displaceably or rockably mounted.

These and other characteristics of the invention will become further apparent from the following description of an embodiment of the invention, reference being made to the claims and the drawings in which:

Fig. 1 is a top plan view of an adjustable guide system embodying the invention.

Fig. 2 is a section taken along line II—II of Fig. 1.

Figs. 3, 4 and 5 are, respectively, a top plan view, a side elevation and a front elevational view of a key or wedge member employable in the invention and coacting with a set screw, said views being shown on an enlarged scale.

Figure 4:
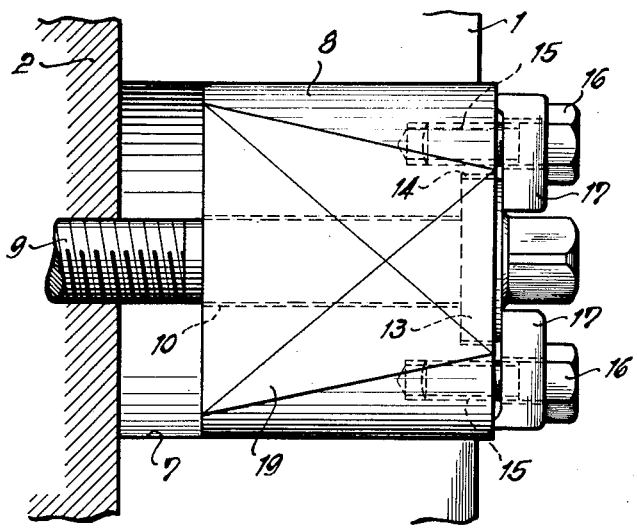

Referring more particularly to the attached drawings, there is disclosed a displaceable guide rail or ledge 3, which is supported on a machine part 1 which may be, for example, a frame of a press, said guide rail or ledge 3 being adapted to guide a machine part 2, e.g., a press ram. This guide ledge 3 is provided with a plurality of elongated holes or perforations 4, through which extend screws 5 threaded into the machine part 1, by means of which screws the guide rail may be secured in an adjusted position through the medium of washers 18. On the side of the guide ledge opposite the side facing the machine part 2 to be guided, recesses 6 are provided, and corresponding recesses 7 are arranged in the machine frame part 1. Into the recesses facing each other, key or wedge members 8 are inserted the key-shaped surfaces 19 of which bear against correspondingly inclined surfaces 6a defining the bottoms of the recesses 6 in the guide ledge 3. The aforesaid members 8 are constituted by cylindrical rotary bodies into the outer surface of which a flat wedge or key-shaped surface 19 is milled (Fig. 4).

The recesses 7 in the machine part 1 are likewise milled or shaped cylindrically so as to correspond to the remaining part of the cylindrical outer surfaces 19 of the key or wedge members 8, so that within said recesses the key or wedge members may turn about their axis of rotation.

Each key or wedge member 8 has a bore 10 to receive a set screw 9 to be threaded into the machine part 1. By means of this screw the key or wedge member may be pressed against the correspondingly inclined surface of the guide ledge 3, so that while the screws 5 are still loosened, the ledge may be adjusted relative to the machine part 2 to be guided.

Figure 3:
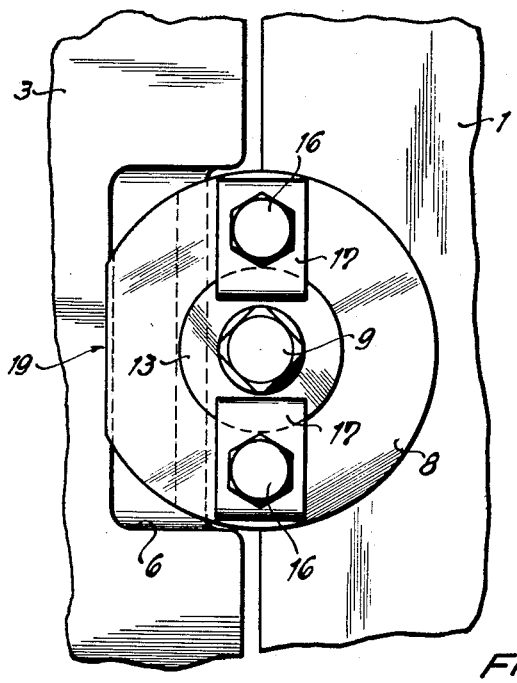

At their upper ends the set screws 9 are provided with a collar 13, which is located in a corresponding recess 14 of the key or wedge member 8. In the embodiment of Figs. 3 and 4 two tapped holes 15 are provided near the recess, said holes being adapted to receive two clamping bolts 16, which through the medium of clamping claws 17 press onto the collar 13 of the respective set screw 9, thus securing the latter against unintentional turning.

In order to accomplish a close or snug fit of the wedge or key-shaped surfaces of the key or wedge members relative to the corresponding contact surfaces of the guide ledge 3, the key or wedge members may be disposed independently, whether they are rotary bodies or not, at the guiding machine part, for example, at key or wedge edges thereof.

It can thus be seen that there has been provided according to the invention a guide system for slidable machine parts having a guiding surface, said system comprising a guide ledge arranged for adjustment relative to the machine part to be guided, at least one key or wedge having a key or wedge surface engaging between the guide ledge and the frame supporting said machine part, said key or wedge surface being parallel to the direction of movement and inclined with respect to the plane of movement of the machine part to be guided, means connected to said key or wedge for displacing the same in a plane lying at right angles to both the plane of movement and the direction of movement of the machine part to be guided, so that the guide ledge may be adjusted toward and away from the guiding surface of the machine part to be guided upon displacement of said key or wedge to produce a motion component acting at right angles to the plane of movement of the machine part to be guided.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A guide system for a reciprocally movable machine part, comprising a frame member having a face defined by an outwardly directed flange extending the length of said frame member, said flange being provided with a plurality of spaced arcuate recesses therein, said reciprocally movable machine part being provided with a guiding surface which is inclined with respect to said frame member, a guide ledge disposed between said machine part and said frame member and adapted for lateral displacement therebetween, said guide ledge having first and second opposed inclined faces, said first inclined face being slidably engageable with said inclined guiding face of said machine part, said second inclined face being spaced from said flange, said second face having a plurality of rectangular recesses aligned opposite said spaced arcuate recesses to thereby form a plurality of chambers, substantially cylindrical wedge members disposed in said chambers, respectively, each of said wedge members having a flat face portion and a diametrically opposed cylindrical portion, said flat face portions abutting against the respective rectangular recesses of said guide ledge, whereas said respective cylindrical portions are contiguous with the arcuate recesses of said flange, first means carried by said frame member for adjustably securing said guide ledge to said frame member, and second means for adjustably securing each of said wedge members to said frame, whereby said guide ledge via said wedge member may be laterally displaced towards and away from said inclined guiding surface of said machine part, to thereby ensure accurate positioning and guiding of said machine part in said frame.

2. A guide system for a reciprocally movable machine part, comprising a frame member having a face defined by an outwardly directed flange extending the length of said frame member, said flange being provided with a plurality of spaced arcuate recesses therein, said reciprocally movable machine part being provided with a guiding surface which is inclined with respect to said frame member, a guide ledge disposed between said machine part and said frame member and adapted for lateral displacement therebetween, said guide ledge having first and second opposed inclined faces, said first inclined face being slidably engageable with said inclined guiding face of said machine part, said second inclined face being spaced from said flange, said second face having a plurality of rectangular recesses aligned opposite said spaced arcuate recesses to thereby form a plurality of chambers, wedge members disposed in said chambers, respectively, each of said wedge members being a substantially truncated cylinder having a truncated portion and a diametrically opposed cylindrical portion, said truncated portions abutting against the respective rectangular recesses of said guide ledge, whereas said respective cylindrical portions are contiguous to the arcuate recesses of said flange, the surface area of each of said truncated portions of said wedge members which abuts each of said rectangular recesses of said guide ledge being substantially equivalent to the surface area of each of said diametrically opposed cylindrical portions which extend into each of said arcuate recesses, first means carried by said frame member for adjustably securing said guide ledge to said frame member, and second means for adjustably securing each of said wedge members to said frame, whereby said guide ledge via said wedge member may be laterally displaced towards and away from said inclined guiding surface of said machine part, to thereby ensure accurate positioning and guiding of said machine part in said frame.

3. A guide system according to claim 1, said means for adjustably securing said wedge means comprising a plurality of threaded adjusting screws extending freely through said wedge means into said frame to facilitate adjustment of said wedge means at right angles with respect to the lateral displacement of said guide ledge.

4. A guide system for a reciprocally movable machine part, comprising a frame member having a face defined by an outwardly directed flange extending the length of said frame member, said flange having arcuate recesses therein, a guide ledge disposed between said machine part and said frame member for lateral movement therebetween, said guide ledge having tapered recesses therein aligned with said arcuate recesses, wedges having tapered portions and arcuate portions disposed between said guide ledge and said flange with said tapered portions being engaged in said tapered recesses and with said arcuate portions being engaged in said arcuate recesses and abutting against said guide ledge, and means adjustably securing said wedges to said frame so that said guide ledge via said wedges may be laterally displaced towards and away from said machine part to thereby ensure accurate positioning and guiding of said machine part in said frame member.

References Cited in the file of this patent

UNITED STATES PATENTS

| | | |
|---|---|---|
| 1,225,726 | Becker | May 8, 1917 |
| 1,653,030 | Zeh | Dec. 20, 1927 |
| 2,321,741 | Flowers | June 15, 1943 |